Feb. 29, 1944.     C. RUNYAN     2,342,697
STEERING MECHANISM FOR TRAILERS
Filed Nov. 30, 1940     4 Sheets-Sheet 1
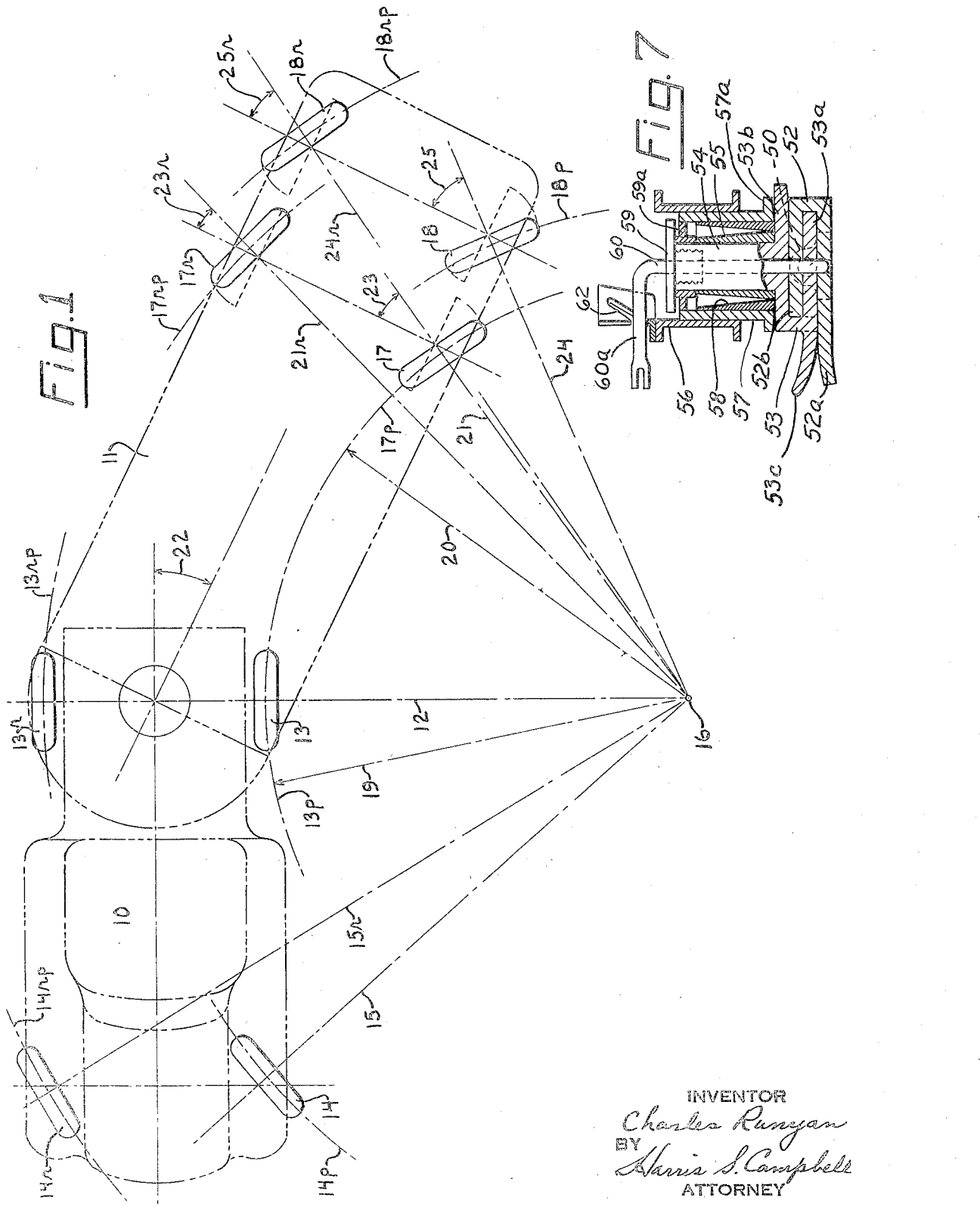
INVENTOR
Charles Runyan
BY
Harris S. Campbell
ATTORNEY

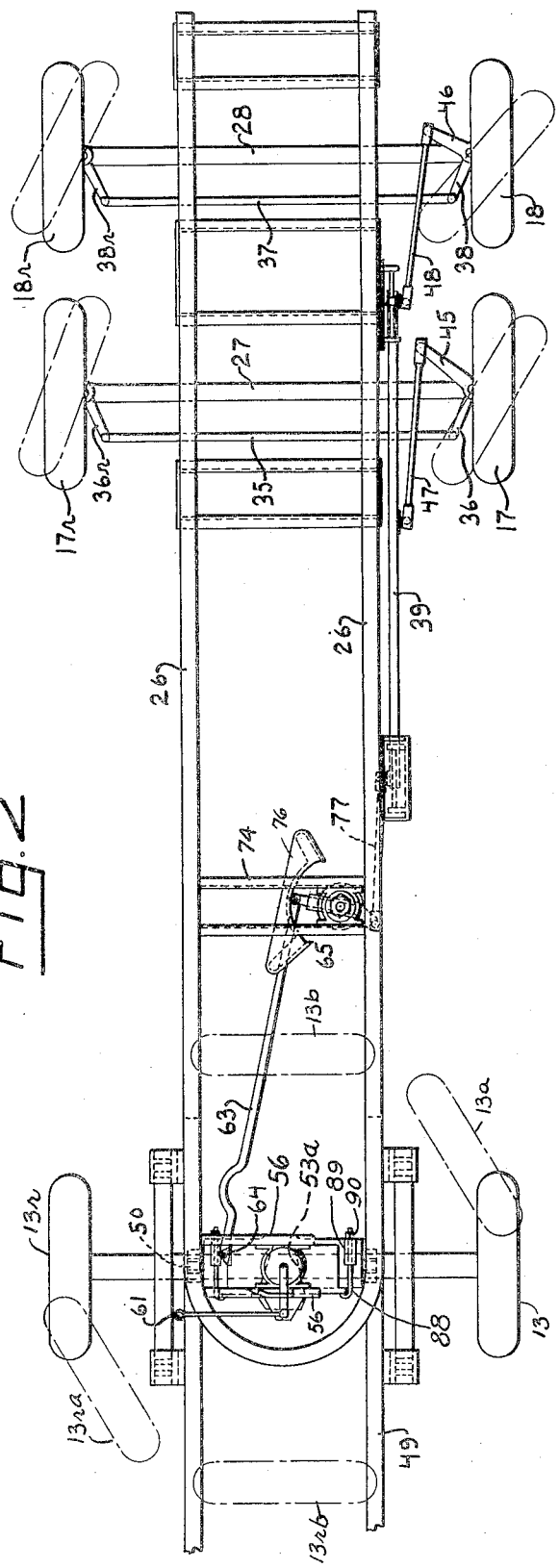

Feb. 29, 1944.  C. RUNYAN  2,342,697
STEERING MECHANISM FOR TRAILERS
Filed Nov. 30, 1940  4 Sheets-Sheet 3
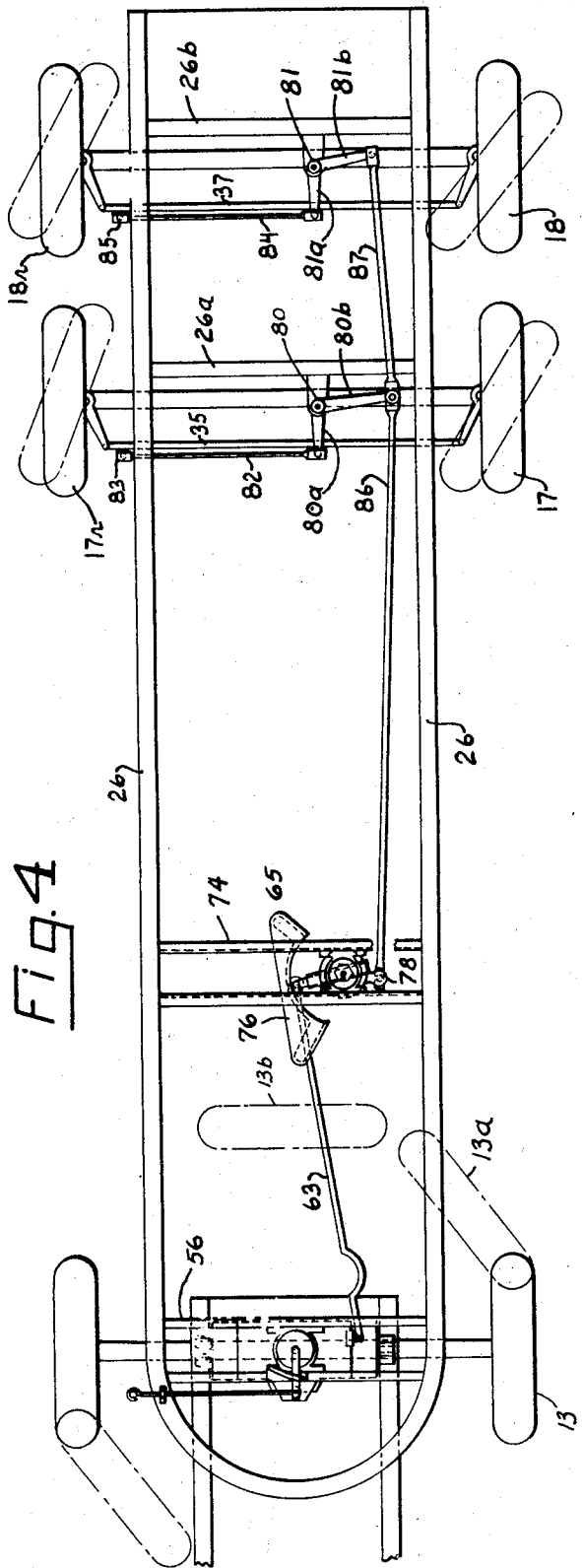
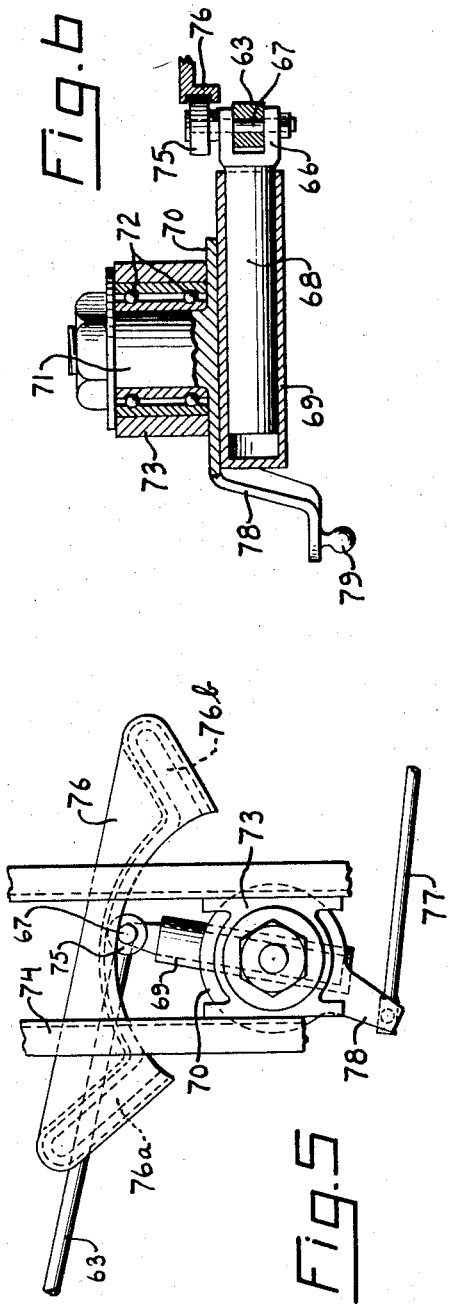
INVENTOR
Charles Runyan
BY
Harris S. Campbell
ATTORNEY Feb. 29, 1944. C. RUNYAN 2,342,697
STEERING MECHANISM FOR TRAILERS
Filed Nov. 30, 1940 4 Sheets-Sheet 4
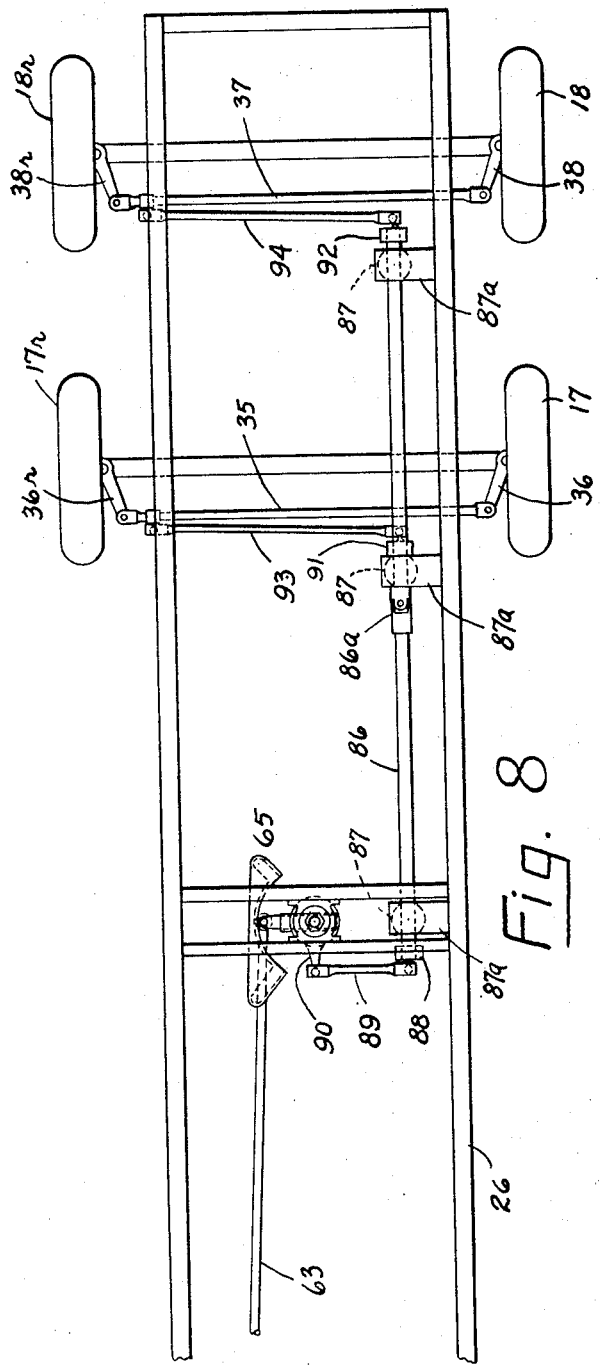
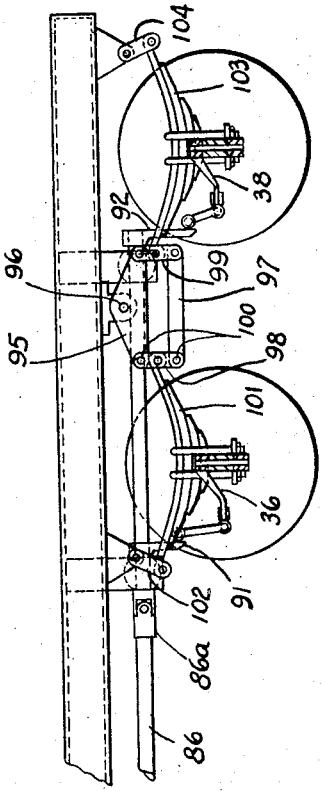
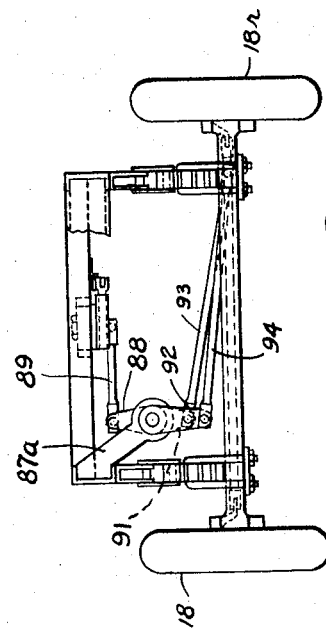
INVENTOR
*Charles Runyan*
BY
*Harris S. Campbell*
ATTORNEY Patented Feb. 29, 1944

2,342,697

UNITED STATES PATENT OFFICE 2,342,697

STEERING MECHANISM FOR TRAILERS

Charles Runyan, Great Meadows, N. J.

Application November 30, 1940, Serial No. 367,931

14 Claims. (Cl. 280—33.55)

This invention relates to trailer vehicles and is particularly concerned with steering mechanism therefor.

Most trailer units used for carrying heavy burdens have tandem axles and wheels for distributing the load to the tires. It has previously been proposed to provide steering mechanism which permits improved maneuverability of such trailer units, particularly for turning corners and getting into restricted places. In my patents, #2,069,928 and #2,132,580 issued February 9, 1937, and October 11, 1938, respectively, I have disclosed steering mechanism generally adaptable to such trailer units. It is the purpose of the present invention to provide improved structure and mechanism for the steering connections for trailers.

In arranging for the steering of the front wheels of a motor vehicle it is well known that the center of turning lies on a line extending from the rear axle of the vehicle. The steering linkage mechanism is proportioned to provide that both the front wheel on the inside and the wheel on the outside of the turn, move through the proper angle so that each spindle points to the same turning center on the extended rear axle line. The problem for turning the rear trailer wheels when tandem wheels are used is somewhat more involved. It is one of the primary objects of the present invention to provide mechanism which will turn all the wheels of the trailer unit, particularly during sharper turns such as negotiating a corner, so that the extension of each wheel axis will approximately intersect at a point located on the extension of the rear axle of the tractor vehicle. In this way improved turning action results and the tires are subject to less wear since slipping thereof is substantially eliminated. Another advantage is that the steering mechanism may be actuated by lower loads during steering maneuvers.

An object of the invention is to provide improved throwout mechanism for preventing steering motions from being transmitted to the trailer wheels after the tractor vehicle has assumed an angular position beyond that of normal maximum turning. Such positions may occur during backing up and maneuvering during placing of the vehicle in the desired position for loading and unloading.

A more specific object is to provide mechanism which will cause greater angular movement of the rear pair of steerable wheels than the front pair and at the same time provide increased angular displacement of the inside wheels during a turn than the outside wheels.

A still further object is to provide steering mechanism which permits each pair of wheels to be mounted by independent springs to the frame of the trailer. In previous vehicles of this nature it has been necessary to interconnect the axle or spring elements in a fashion to cause predetermined related movements, such as by the use of rods interconnecting the axles or connecting the axles and the frame, in order to prevent springing movements from unduly affecting steering movements. With the steering linkage of the present invention, however, the springs may be mounted in any suitable fashion to give the desired load distribution and cushioning without interfering with the steering movements, thereby providing improved riding characteristics for the vehicle.

How these and other objects and advantages are accomplished will be obvious from the following description of the drawings in which—

Figure 1 is a diagrammatic view of a trailer and tractor vehicle illustrating the general steering requirements for the present invention.

Figure 2 is a plan view of the trailer showing the control mechanism for actuating the trailer wheel steering.

Figure 3 is a side elevation of the parts shown in Figure 2.

Figure 4 is a plan view generally similar to Figure 2 of an alternative linkage arrangement for the steering mechanism.

Figure 5 is a plan view of the throwout device of the present invention to an enlarged scale.

Figure 6 is a sectional view of the throwout device.

Figure 7 is an enlarged sectional view of the pivotal connecting mechanism at the front of the trailer.

Figure 8 is a plan view of an alternative form of steering mechanism.

Figure 9 is a rear elevation showing the steering mechanism of Figure 8.

Figure 10 is a side elevation of a rear portion of the parts shown in Figures 8 and 9 illustrating the spring support.

In Figure 1 the tractor vehicle is indicated by numeral 10 and the trailer by numeral 11. The tractor 10 and trailer 11 are in their relative positions assumed in making a comparatively sharp turn, such as negotiating a corner. Line 12 is an extension of the axle for the rear wheels 13 of the tractor vehicle. The front wheels 14 and 14r of the tractor vehicle are illustrated in deflected position, such as when the operator has turned the steering wheel to make a left hand turn. It will be seen that the lines 15 and 15r representing the extension of the axles of the front wheels 14, 14r, intersect line 12 at point 16.

The trailer unit 11 is equipped with two pairs of wheels 17, 17r and 18, 18r arranged in tandem fashion. These wheels are mounted for angular movement with respect to their axle frames in a fashion generally similar to the steerable front wheels of trucks and other vehicles. In the example illustrated, the steering angles for the trailer wheels have been selected so as to provide that the trailer wheels will assume a path during turning following closely the path of the wheels for the tractor vehicle. Thus, if the rear tractor wheels 13 clear a curb at the inside of a turn, the wheel 17 of the trailer vehicle will also clear the curb. The turning radius for the rear wheels of the tractor vehicle is indicated at 19. An equal turning radius 20 is shown for the front trailer wheels 17. To provide this turning radius the steering mechanism must deflect wheel 17 through an angle such that the spindle for wheel 17 lies on a line 21 extending through point 16.

For a vehicle having the proportions illustrated in Figure 1 the axis of the tractors unit and the trailer unit must make an angle 22 with respect to each other to fulfill the turning requirements set forth above. Further, the angle which the wheels 17 must steer through is illustrated at 23. It will thus be seen that for angular deflection between the vehicle and trailer as shown the steering mechanism must be operated to produce the wheel deflection indicated at 23.

In order to prevent excessive skidding and sliding of the tires on the trailer wheels while negotiating a turn, it is necessary that the spindles of all the wheels be aligned to intersect at the same point as line 21 for wheel 17, that is at point 16 approximately. Thus the extension of spindles for wheel 17r will be the line 21r and the extension for the spindles on wheels 18 and 18r will be lines 24 and 24r respectively. Therefore the steering linkage and connections must be such that for deflections of wheels 17 through the angle 23, the wheel 17r will be deflected through angle 23r, the wheel 18 will be deflected through angle 25 and wheel 18r through angle 25r. The paths of the various wheels during a continued turn are indicated at 13p, 13rp, 14p, 14rp, etc. It will be noted that for proper turning action the rear wheels of the trailer must be deflected through a greater steering angle than the front wheels. Also the inside wheels are deflected through a greater angle than the outside wheels.

If desired, the point of intersection of the lines 21, 21r and 24 and 24r with the line 12 may be arranged to be either closer or further from the tractor vehicle than the point 16, depending upon whether a smaller or greater radius of turning is desired for the trailer. It will be obvious that such variations in the steering characteristics may be attained by proper proportioning of steering mechanism of the type disclosed.

In negotiating a right hand turn, the trailer wheels 17r and 18r become the inside wheels so that the angles through which the wheels are deflected must be reversed. Mechanism for controlling the wheels in a fashion to meet the foregoing requirements is disclosed in Figures 2 and 3.

The frame of the trailer is indicated at 26. The axle for the front wheels is shown at 27 and that for the rear wheels at 28. Springs 29 and 30 support the axles 27 and 28 respectively. These springs are attached to the frame 26 by suitable means such as brackets 31 and 32 and swinging links 33 and 34. Each of the wheels is shown pivotally mounted for steering movements about an axis offset from the center of the wheel. It will be obvious, of course, that this steering pivot may be inclined in the usual manner so as to intersect the ground at a point approximately in the center of the tire so as to provide a minimum of resistance to turning of the wheels.

In front of axle 27 cross rod 35 connects the ends of arms 36 and 36r attached to the wheels. Arms 36 and 36r are directed inwardly making an angle with the planes of the wheels. Thus movement of wheel 17 inwardly at the front causes lesser angular movement of wheel 17r outwardly at the front and vice versa. A similar linkage and arm system is provided for the rear wheels at 37, 38 and 38r.

To transmit the turning movements to the wheels, a rod 39 is supported on frame 26 by means of brackets 40 and 41. To provide for sliding movement of the rod 39, but prevent rotational movement, a terminal fitting 42 is provided at each end of rod 39. Fitting 42 is composed of an arm projecting from opposite sides of rod 39 and a collar 43 on the end of each arm. Collars 43 are supported for sliding movement on rods 44, which in turn are mounted on brackets 40, 41.

Arms 45 and 46 are attached to wheels 17 and 18 respectively and connecting rods 47 and 48 are provided to transmit motion from rod 39 to produce the steering movements of the wheels. It will be noted that the front arm 45 is longer than arm 46 in order to provide greater angular movement of the rear wheel 18 than the front wheel 17 for a given displacement of the rod 39. The angle at which the arms project is selected to give the proper relative amount of outward and inward deflection of the wheels.

The front end of the trailer is mounted by a pivotal connection, commonly called a fifth wheel, on the tractor vehicle. This connection is in some respects generally similar to the connecting mechanism illustrated in my Patent #2,069,928 issued February 9, 1937. The frame of the tractor vehicle is shown at 49. By reference to Figures 2, 3 and 7 the details of the connecting device will be understood more readily. Attached to frame 49 are bearing blocks 50, in which axle 51 is supported, which axle in turn carries the structure 52 composed of a lower plate and an upper plate, 52a and 52b, with a suitable tapered space therebetween. Attached to the trailer frame is a complementary structure 53 composed of lower plate 53a and upper plate 53b, the lower plate 53a being shaped to fit the tapered space between plates 52a and 52b. The horizontal axle 51 is located approximately in the plane of the interconnecting plates 52 and 53, thus providing direct pulling action which does not cause a tilting tendency on axle 51. This location for axle 51 also assures improved coupling action since the lower plate structure 52 will remain in proper hitching position even though it may strike part 53 during coupling. Cross frame members 49a (Figure 3) limit the degree of tilting of part 52 thus preventing it from being displaced to a position which would not permit easy connection with co-operating trailer part 53. Trailer jack mechanism (not shown), which may be of customary construction, is used to support the front end of the trailer in proper position for coupling. Upturned tongue 53c helps part 53 to ride over plate part 52 in case the height is not in accurate adjustment.

An axle member 54 is connected to the upper plate 53b. On member 54 an annular conical part 55 is supported. Attached to frame 26 by means of cross members 56 is a cylindrical hub part 57 having a lower bearing flange 57a. Inside hub 57 is a complementary conical part 58 contacting conical part 55. The purpose of these parts is to permit relative lateral movement of the frame 26 with respect to the tractor vehicle to prevent distortions in said frame at such times as the wheels of the tractor and trailer are not on level ground. This is a simple and effective method of providing the desired angular freedom although it will be obvious that other suitable means, for example a ball joint, may also be used.

A nut part 59 co-operates with the axle part 54 to maintain assembly of the pivot parts. A spacer member 54a is retained by nut 59 to prevent angular movement on pivot 54 longitudinally since this angularity is provided for by pivot 51. Clearance of member 59a with wall of cylinder 57 is provided in the lateral direction to permit angular movements in the transverse sense. A pin 60 projects down through the complete assembly and may be partly withdrawn to permit assembly and disassembly of the structures 52 and 53 for the purposes of hitching and unhitching the trailer. The pin 60 may be withdrawn to permit unhitching by pulling handle 61 which turns part 60a in the slot 62, thereby removing pin 60 from operative position. Pin 60 prevents reversal of loads from disconnecting the trailer hitch, as for example when backing.

For added safety a pair of rod members 88 have been provided to hook into suitable holes in part 53 after hitching. Rods 88 are anchored by bosses 89 attached to part 52 and tightened by nuts 90. These rods not only prevent the possibility of accidental uncoupling but also serve to remove any lost motion or play in the connection thereby eliminating any small movements which might cause slight undesirable steering motions.

Part 53 has a long contact surface at the forward side of 52 so that when these two parts are hitched together they produce an intimate assembly whereby movements in a turning sense of the frame 49 of the tractor vehicle are transmitted to pivot part 53. In order to transmit the turning movements to the rear wheels for steering purposes, a rod 63 is pivotally attached at 64 to the top plate 53b so that movements are directly transferred to rod 63.

It will be observed that steering movements are desired only in the range of angular displacement which the tractor vehicle makes while making the normal turning movements and not during extreme angular movements of the tractor vehicle, such as occur in maneuvering the trailer into loading or storage positions. The tractor vehicle wheels 13, 13r are indicated at 13a and 13ra in position for normal turning. The extreme position of the tractor vehicle wheels is shown at 13b and 13rb. In order to permit these extreme movements without transferring them to the rear wheels a device indicated generally at 65 is interposed between rod 63 and the rod 39.

This device is illustrated in greater detail in Figures 5 and 6 where it will be seen that the connecting rod 63 attaches to a fork 66 by means of pivot 67. Fork 66 is attached to cylindrical arm member 68 which is telescopically associated with the housing 69. This in turn is fastened rigidly to plate 70 mounted for rotation with axle 71 in bearings 72 which are supported in housing 73 on cross frame member 74. A roller 75 is also mounted on pivot member 67 and guided in track 76, which is shaped in the form of an arc. The steering rod 39 is connected to the unit 65 by means of connecting rod 77 to transmit the swinging movement of the unit for steering purposes. Projection 78 supports the ball joint 79 to which the push rod 77 is attached to the unit 65. The length of the arc shaped portion of the guide track 76 is determined by the amount of movement required for steering purposes. Beyond this angular movement the guide track 76 has radial extensions 76a and 76b, which permit the fork end 66 and its attached cylindrical member 68 to extend approximately radially by sliding in housing 69, thereby permitting additional movement of the front rod 63 without causing further angular movement of the device 65.

Thus when the tractor unit is maneuvered to an extreme angle, as by backing or jack-knifing to place the trailer in position in cramped quarters, the steering mechanism is displaced to its maximum position after which the tractor may assume greater angular positions without further steering action. As soon as the tractor is returned to a position within the normal range of steering movement, the steering mechanism is automatically brought back into operation.

This improved throwout device is positively controlled since the roller is accurately guided by the track in all positions and does not rely upon the use of springs or the like for resuming operating positions.

In Figure 4 is shown a somewhat different arrangement for the steering mechanism for the rear wheels. In this form bell cranks 80 and 81 are attached to cross frame members 26a and 26b. An arm 80a actuates connecting rod 82 which is attached at 83 to the cross rod 35. Similar parts are shown for the rear set of wheels at 81a, 84 and 85. The transverse arms 80b and 81b are connected by means of push-pull rods 86 and 87 to the arm 78 of the steering device 65. The remainder of the steering mechanism is generally similar to that shown in Figure 2 except that connecting rod 63 attaches to the opposite side of the fifth wheel unit in order to give the proper direction of steering movement necessitated by the introduction of the bell cranks.

The rear bell crank arm 81b is shorter than the front arm 80b to provide the increased angularity required on the rear wheels as compared to the front wheels of the trailer unit.

In the form of steering mechanism illustrated in Figures 8, 9 and 10, a torque shaft 86 is provided to transmit the steering movements from the throwout device 65 to the rear wheels. Torque shaft 86 includes a universal joint 86a and is supported in self aligning bearings 87 which are mounted in brackets 87a. The self aligning bearings and universal joint ensure that the torque shaft will operate freely with no danger of binding which might otherwise cccur due to twisting of the frame during use of the vehicle. At the front end of shaft 86 there is an upright lever 88 which is interconnected to the steering and throwout device 65 by means of rod 89. The steering and throwout device 65 is generally the same as that described in connection with Figures 2, 5 and 6. The arm 90 of the throwout 65 is located in a fore and aft direction so as to provide a transverse motion which transfers steering movements to the shaft 86.

Lever arms 91 and 92 are attached to the torque shaft 86 in a position to provide for steering the front and rear pair of wheels respectively. The levers 36, 36r and connecting bar 35, for the front pair of wheels, and also the corresponding parts 38, 38r and 37 are similar to the parts associated with the forms of steering mechanism shown in Figures 2 and 4. Transverse rods 93 and 94 are pivotally attached to the ends of levers 91 and 92 and to the wheel interconnecting bars 35 and 37. It will be noted that the rear arm 92 is longer than the arm 91, thereby providing increased angular movement for the rear wheels 18 to give the steering action previously discussed.

The spring suspension illustrated in Figures 9 and 10 is of the equalizing type. An equalizing bar 95 is pivotally mounted at 96 to the frame. A parallel link member 97 is supported by front and rear links 98 and 99, which links are pivoted by pivots 100 to the bars 95 and 97. The front spring 101 is supported on link 98 and also at the front end on sway link 102. The rear spring 103 is similarily mounted to links 99 and 104.

This type of spring mounting provides for equalizing the loads to the front and rear wheels regardless of unevenness in the surface of the ground. Desirable springing qualities are obtained which allow the vehicle to operate over rough ground surfaces and at the same time give improved riding qualities when operating at high speeds over road surfaces which are slightly uneven.

With this type of spring mounting considerable fore and aft movement of the wheels with respect to the frame may occur. The steering mechanism of the present invention permits the use of such spring suspension since it will be obvious that the steering linkage arrangement will not be affected by movements of the wheel springing system. The form of the steering system using the longitudinally disposed torque shaft provides a simple and rugged steering mechanism.

It will be seen, therefore, that I have provided a greatly improved and simplified steering mechanism to produce more accurate movements of trailer wheels while negotiating turns. The use of steering rods which individually connect the wheels of the rear axle and the wheels of the front axle to a common steering actuating member supported on the frame permits the use of efficient springing arrangements for the two sets of wheels, thus giving greatly improved riding qualities while at the same time preventing inadvertent steering movements of the wheels. My improved steering throwout device is simple in construction and reliable in operation.

I claim:

1. For a vehicle, a tractor unit, a trailer unit, having a frame supported on the tractor unit by a vertical pivot device which permits approximately 180° rotation of the tractor unit with respect to the trailer unit, a second pivot device supported on said frame and adapted to swing through an angle less than 180°, means interconnecting said pivot devices, said second pivot device including mechanism to permit pivotal movement thereof during movement of the first pivotal device for a limited angle from neutral position and to prevent pivotal movement of said second pivotal device for extreme angular movements of the first pivotal device, two tandem axles located to support the rear end of the trailer unit, each having a pair of wheels mounted thereon for steering movement, means interconnecting said second pivotal device and each pair of wheels, said means being adapted to cause greater angular steering movement on the rear pair of wheels than on the front pair of wheels, said means further including a longitudinally disposed rod member and two additional push rod elements, one of said elements being adapted to transmit steering movements from the longitudinal rod member to the front pair of wheels and the other adapted to transmit the steering movements to the rear pair of wheels.

2. A vehicle having a tractor unit and a trailer unit connected together by a pivotal device permitting approximately 90° angular movement therebetween on each side of neutral, a pair of tandem axles having wheels mounted thereon for steering movements located near the read end of said trailer unit, a throwout device for limiting the steering angle, means interconnecting said pivotal device and said throwout device, additional means including longitudinal rod means interconnecting said throwout device and said steerable wheels, said additional means including actuating members proportioned to cause steering movements of both sets of wheels about approximately the same turning center as that for the tractor vehicle.

3. For a trailer vehicle, a pivotal device for attachment to a tractor vehicle, tandem steerable rear supporting wheels, a steering and throwout unit operatively associated with said device, a longitudinally disposed rod for transmitting steering movements from said unit to the wheels, a push-pull rod at the front end of said longitudinal rod for connecting to said unit and two push-pull rods connecting the longitudinal rod and the steering links for said tandem wheels.

4. For a tractor drawn trailer, a frame, pivotal mechanism for connecting to a tractor vehicle located at the forward end of said frame, tandem wheel units having tandem axles with steerable wheels mounted thereon supporting the rear end of said frame, a steering connection on said pivotal mechanism for actuating said wheels upon turning maneuvers of the tractor vehicle, a device mounted on said frame for restricting the transmission of steering movements to said wheels to approximately the normal turning range of said tractor vehicle, a connecting rod between said pivotal mechanism and said device, a longitudinal rod supported on said frame for sliding movements and actuated by said device, an arm member associated with each of said tandem wheel units and a connecting rod between each arm member and said slidable rod.

5. A trailer having a frame supported at the rear end by tandem wheel units, each unit having a pair of steerable wheels mounted thereon, a pivotal connecting device at the front end of said frame for attaching to a tractor vehicle, means for steering all of said wheels upon normal turning maneuvers of the tractor vehicle, said means including a rod supported on said frame for longitudinal sliding movement, an arm associated with the steering mechanism for each pair of wheels, the arm for the rear pair of wheels being shorter than that for the forward pair of wheels, a rod connecting each arm with said longitudinal slidable rod.

6. A trailer having a frame supported at the rear end by tandem wheel units each having a pair of steerable wheels mounted thereon, a pivotal connecting device at the front end of said frame for attaching to a tractor vehicle, means for steering all of said wheels upon normal turning maneuvers of the tractor vehicle, said means including a longitudinally disposed element, means interconnecting said element and the tandem wheel units including a transverse link and an arm member associated with each wheel unit, the arm member associated with one of said wheel units being shorter than the other arm member whereby greater angular steering movement is imparted to the rear wheels.

7. A trailer having a frame supported at the rear end by tandem wheel units, each unit having a pair of steerable wheels mounted thereon, a pivotal connecting device at the front end of said frame for attaching to a tractor vehicle, means for steering all of said wheels upon normal turning maneuvers of the tractor vehicle, said means including a longitudinally disposed rod, steering mechanism for each pair of wheels including a transverse rod for transmitting proper relative steering movements therebetween, a bellcrank associated with each pair of wheels and having two arms, one of which is connected by a rod to said steering mechanism, the other arm of each bellcrank being interconnected with said longitudinal rod.

8. For a trailer, a connecting device for attaching to a tractor vehicle, said device including a part fixed with respect to the trailer, another part having a pivot connection to the first part, said second part being adapted for attachment to the tractor vehicle, adjustable clamping means for removing lost motion between said second part and the tractor vehicle, steerable rear wheels for supporting the trailer, mechanism for transmitting steering movements to the rear wheels upon turning of the trailer connection device, said mechanism including an element connected to said second part of said connecting device.

9. A trailer having a frame supported at the rear end by tandem wheel units, each unit having a pair of steerable wheels mounted thereon, a pivotal connecting device at the front end of said frame for attaching to a tractor vehicle, means for steering all of said wheels upon normal turning maneuvers of the tractor vehicle, said means including a longitudinally disposed rod supported on said trailer, a throwout device for permitting angular movement of the tractor vehicle beyond the steering range, a push-pull rod interconnecting said device and the front end of said longitudinally disposed rod, two push-pull rods connected to the rear portion of said longitudinal rod, one of said push-pull rods connected to actuate the steering mechanism for the forward tandem wheels, and the other push-pull rod connected to actuate the steering mechanism for the rear tandem wheels.

10. For a trailer vehicle, two rear axles having wheels mounted thereon for steering movements, means at the front end of the trailer vehicle for connecting to a tractor vehicle, mechanism for actuating said wheels including a steering control and throwout device, an element interconnecting said throwout device and said connecting means, a longitudinally disposed member for transmitting the movements of said steering device to said wheels, an arm member associated with the steering mechanism for the wheels of said front axle and an arm associated with the steering mechanism for the wheels of said rear axle, one of said arms having a greater length than the other whereby greater angular steering movements may be imparted to the wheels of said rear axle than to the wheels of said front axle, a push rod attached to each of said arms for transmitting steering movement from said longitudinally disposed member.

11. A trailer having two pairs of wheels supporting the rear end, means at the front end for supporting and attaching to a tractor vehicle, steering mechanism for the rear wheels actuated by angular movements between the tractor and trailer vehicle during normal turning operations, said mechanism including a steering control and throwout device located between said wheels and said connecting means, a rod to actuate said steering and throwout device interconnecting said device and said attaching means, a torque shaft mounted for rocking movements and having an arm interconnected to said steering and throwout device, a second arm with interconnections for actuating the front pair of wheels for steering movements and a third arm interconnected to actuate the rear pair of wheels for steering movements, said third arm being longer than said second arm, thereby providing for increased steering movements on said rear pair of wheels.

12. A trailer having an axle and a pair of steerable wheels supporting the rear end thereof, a pivotal device for supporting the front end of the trailer on a tractor vehicle, a steering and throwout unit to transfer steering motion to the wheels only during normal turning relationships of the trailer with the tractor vehicle, a bellcrank mounted on a fixed part of said trailer, a longitudinal rod connecting said unit and one arm of said bellcrank and a transverse rod attached to the other arm of said bellcrank to transmit the steering movements to said wheels.

13. For a trailer unit having a frame adapted to be pivotally supported at the front end by a tractor vehicle, at least two sets of wheels arranged on tandem axles for supporting the rear end of said frame, mechanism actuated by turning movement of the tractor vehicle to steer all of said wheels in a fashion to cause the rear end of said trailer unit to follow a path during turning generally the same as said tractor vehicle, said mechanism including a longitudinally disposed member entirely supported on said frame and movable with respect thereto for control purposes only, means interconnected with said longitudinal member for actuating the front set of wheels and separate means interconnected with said longitudinal member for actuating the rear set of wheels, said mechanism further including means to cause greater angular steering movement on the rear set of wheels than on the front set.

14. A trailer having a frame supported by at least two wheel units, each unit having a pair of steerable wheels mounted thereon, a pivotal connecting device at the front end of said frame for attaching to a tractor vehicle, means for steering all of said wheels upon normal turning maneuvers of the tractor vehicle, said means including for each pair of wheels, a bellcrank mounted on said frame and having two arms, a transverse rod attached to one arm of each bellcrank for transmitting steering movements to the wheels, said means further including a longitudinal rod interconnecting the other arms of said bellcranks.

CHARLES RUNYAN.